US008363690B2

(12) United States Patent
Nossen et al.

(10) Patent No.: US 8,363,690 B2
(45) Date of Patent: Jan. 29, 2013

(54) CODEWORD SYNTHESIZING SYSTEM AND A CORRELATION SYSTEM, METHODS OF OPERATION THEREOF AND A SPREAD SPECTRUM COMMUNICATIONS TRANSCEIVER EMPLOYING THE SAME

(75) Inventors: Michael J. Nossen, Somerset, NJ (US); Steve J. Nossen, Somerset, NJ (US); Richard R. Shively, Morristown, NJ (US)

(73) Assignee: Alcatel Lucent, Paris (FR)

( * ) Notice: Subject to any disclaimer, the term of this patent is extended or adjusted under 35 U.S.C. 154(b) by 2849 days.

(21) Appl. No.: 10/229,850

(22) Filed: Aug. 28, 2002

(65) Prior Publication Data

US 2004/0042533 A1 Mar. 4, 2004

(51) Int. Cl.
*H04B 1/00* (2006.01)
*H04L 27/06* (2006.01)

(52) U.S. Cl. ......... 375/130; 375/147; 375/146; 375/343

(58) Field of Classification Search .......... 375/365–368, 375/147, 149, 295, 316, 343, 142–145, 150
See application file for complete search history.

(56) References Cited

U.S. PATENT DOCUMENTS

| 5,128,960 A | 7/1992 | van Driest et al. |
| 5,131,006 A | 7/1992 | Kamerman et al. |
| 6,236,648 B1 | 5/2001 | Umetsu |
| 6,266,365 B1 | 7/2001 | Wang et al. |
| 6,282,181 B1 * | 8/2001 | Stark et al. ................ 370/335 |
| 6,650,689 B1 * | 11/2003 | Oishi et al. ................ 375/142 |
| 2003/0002566 A1 * | 1/2003 | McDonough et al. ........ 375/147 |

* cited by examiner

*Primary Examiner* — Sam K Ahn
*Assistant Examiner* — Linda Wong
(74) *Attorney, Agent, or Firm* — Hitt Gaines, PC (57) ABSTRACT

A codeword synthesizing system and a correlation system for use with a spread spectrum communications system. In one embodiment, the codeword synthesizing system typically associated with a transmitter includes a base sequence generating subsystem, a modifier sequence generating subsystem and a concatenating subsystem. The base sequence generating subsystem is configured to create base sequences having a length less than a synthesized codeword. The modifier sequence generating subsystem is configured to create a modifier sequence, and the concatenating subsystem is configured to produce the synthesized codeword by multiplying each of the base sequences by an element of the modifier sequence. In one embodiment, the correlation system typically associated with a receiver includes a partial correlating subsystem, a memory subsystem and a combining subsystem. The partial correlating subsystem correlates base sequences of a synthesized codeword to a template and derives multiple partially correlated resultants. The memory subsystem temporarily stores the partially correlated resultants, and the combining subsystem sums weighted values of the partially correlated resultants to provide a correlated value of the synthesized codeword.

25 Claims, 6 Drawing Sheets

CODEWORD SYNTHESIZING SYSTEM AND A CORRELATION SYSTEM, METHODS OF OPERATION THEREOF AND A SPREAD SPECTRUM COMMUNICATIONS TRANSCEIVER EMPLOYING THE SAME

TECHNICAL FIELD OF THE INVENTION

The present invention is directed, in general, to wireless communication systems and, more specifically, to a correlation system and a codeword synthesizing system for use with a spread spectrum communications system, a method of correlating and synthesizing a codeword and a spread spectrum communications transceiver employing the same.

BACKGROUND OF THE INVENTION

Wireless communication systems continue to expand as the use of mobile computing devices and cellular telephones increases. A common method of wireless communication is a spread spectrum communication system. A spread spectrum communications system, and more specifically a Code Division Multiple Access (CDMA) system, permits a multitude of data signals to be transmitted as sequences of codes in the same frequency band concurrently in support of multiple users, and perhaps several in support of servicing even a single terminal to enable various control and status information to be exchanged in parallel with payload information. The codes are so unique that dozens of users can transmit simultaneously within the same frequency band without interference to each other. Adjacent cell sites, therefore, do not need to necessarily use different frequency bands as in Advanced Mobile Phone Systems (AMPS) and Time Division Multiple Access (TDMA) systems. Instead, each cell site may transmit on each frequency which is available to the various wireless carriers.

Commonly, two levels of codes are used. The first level of code, a "scrambling" code, has the effect of distributing the data signal energy over an assigned frequency spectrum. The second level of code, a spreading or symbol code, which is typically chosen from an orthogonal set of such codes, is applied as an element-by-element multiplication of the scrambling code to communicate the information.

In its simplest form, information in CDMA systems is communicated by symbol codes known to a transmitter and to a receiver which make it more difficult to detect by receivers lacking the symbol code. The symbol code or codeword, for example, may be 128 chips in length such that a single data bit of information may be represented as a particular 128 chip sequence, its negative or combinations thereof. The symbol codeword typically consists of a sequence of "chips" having values of −1 or +1 (polar) or 0 and 1 (non-polar) that are multiplied by (or EXCLUSIVE-OR'd with) the information bits to be transmitted. A chip is a term of art used to distinguish from a bit. One skilled in the art will understand a chip and the relationship between a chip and a bit in spread spectrum communications systems. Accordingly, a logic "0" information bit may be encoded as a non-inverted codeword sequence, and a logic "1" information bit may be encoded as an inverted codeword sequence. Alternatively, a logic "0" information bit may be encoded as a first predetermined codeword sequence and a logic "1" information bit may be encoded as a second predetermined codeword sequence When using a wireless protocol, it is often necessary to search in time for the starting point of the symbol codes rather than rely on previously established synchronization to perform the matched filtering. Searching for symbol codes may occur at the call initiation and at each packet in protocols that are packet oriented. When searching for a symbol code, a correlator of a receiver performs a dot product between a stored copy of the symbol code and a received data signal. A new such dot product is started at least every sample time for the sampled copy of the received signal.

The correlator systems and subsystems (embodied, in part, in hardware) required to distinguish symbol codes represents a significant cost item of a spread spectrum communications receiver. The cost is particularly significant when the objective is to simultaneously search for a large number of codes having a large number of terms. In a commercial Universal Mobile Telecommunications Service (UMTS) system, for example, the initial service request from a mobile terminal on the Receiver Access Channel (RACH) involves a 4000-element code. More specifically, the shift-register type memory that is used to perform constant correlation in detecting CDMA codes is expensive and requires valuable space on printed circuit boards.

Accordingly, what is needed in the art is a system and method for reducing the complexity required to perform constant correlation in spread spectrum communications systems.

SUMMARY OF THE INVENTION

To address the above-discussed deficiencies of the prior art, the present invention provides a codeword synthesizing system for use with a spread spectrum communications system. In one embodiment, codeword synthesizing system includes a base sequence generating subsystem, a modifier sequence generating subsystem and a concatenating subsystem. The base sequence generating subsystem is configured to create base sequences having a length less than a synthesized codeword. The modifier sequence generating subsystem is configured to create a modifier sequence, and the concatenating subsystem is configured to produce the synthesized codeword by multiplying each of the base sequences by an element of the modifier sequence.

In another aspect, the present invention provides a method of synthesizing a codeword for use with a spread spectrum communications system. In one embodiment, the method includes generating base sequences having a length less than a length of a synthesized codeword, creating a modifier sequence, and multiplying each of the base sequences by an element of the modifier sequence to produce a synthesized codeword.

In yet another aspect, the present invention provides a correlation system for use with a spread spectrum communications system. In one embodiment, the correlation system includes a partial correlating subsystem, a memory subsystem and a combining subsystem. The partial correlating subsystem correlates base sequences of a synthesized code to a template and derives multiple partially correlated resultants. The memory subsystem temporarily stores the partially correlated resultants, and the combining subsystem sums weighted values of the partially correlated resultants to provide a correlated value of the synthesized code.

In still another aspect, the present invention provides a method of correlating a synthesized codeword for use with a spread spectrum communications system. In one embodiment, the method includes correlating base sequences of the synthesized codeword to a template and deriving multiple partially correlated resultants. The method also includes temporarily storing the multiple partially correlated resultants, and summing weighted values of the multiple partially correlated resultants to provide a correlated value of the synthesized codeword.

In an additional aspect, the present invention provides a spread spectrum communications system transceiver including an antenna, a transmitter and a receiver. In one embodiment, the transmitter includes a codeword synthesizing system having a base sequence generating subsystem configured to create base sequences having a length less than a synthesized codeword associated with the transmitter, a modifier sequence generating subsystem configured to create a modifier sequence, and a concatenating subsystem configured to produce the synthesized codeword associated with the transmitter by multiplying each of the base sequences by an element of the modifier sequence. In one embodiment, the receiver includes a correlation system having a partial correlating subsystem configured to correlate base sequences of a synthesized codeword associated with the receiver to a template and derive multiple partially correlated resultants. The correlation system also includes a memory subsystem configured to temporarily store the partially correlated resultants, and a combining subsystem configured to sum weighted values of the partially correlated resultants to provide a correlated value of the synthesized codeword associated with the receiver.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
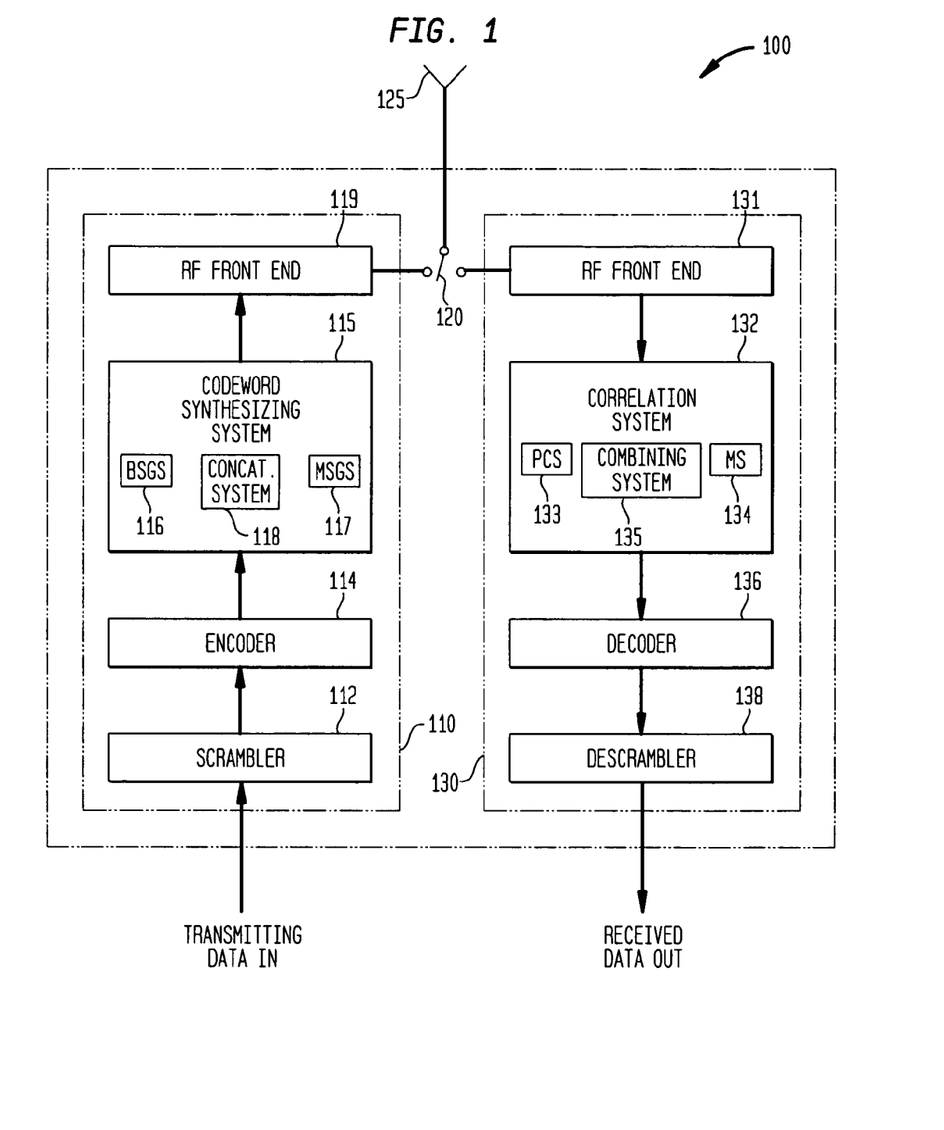
FIG. 1 illustrates a block diagram of an embodiment of a spread spectrum communications system transceiver constructed in accordance with the principles of the present invention.

Referring initially to FIG. 1, illustrated is a block diagram of an embodiment of a spread spectrum communications system transceiver, generally designated 100, constructed in accordance with the principles of the present invention. The spread spectrum communications transceiver 100 includes a transmitter 110, a switch 120, an antenna 125 and a receiver 130. The transmitter 110 includes a scrambler 112, an encoder 114, a codeword synthesizing system 115 and a radio frequency (RF) front end 119. The receiver 130 includes a RF front end 131, a correlation system 132, a decoder 136 and a descrambler 138. The spread spectrum communications transceiver 100 includes an embodiment of the codeword synthesizing system 115 and the correlation system 132 constructed according to the principals of the present invention. Additionally, one skilled in the art will understand that the spread spectrum communications transceiver 100 may include other devices common to a conventional spread spectrum communications transceiver such as a digital-to-analog (D/A) converter in the transmitter 110 or an analog-to-digital (A/D) converter in the receiver 130.

The scrambler 112 receives an input signal, TRANSMITTING DATA IN, and scrambles the DATA IN signal according to a certain polynomial to avoid repeating patterns. The scrambler 112, therefore, effectively distributes the signal energy of the TRANSMITTING DATA IN over a designated frequency spectrum. Generally, the scrambler 112 provides numerous transitions to disrupt series of ones (1's) and zeros (0's) and provide an average DC level of about zero (0). The resulting output of the scrambler 112 is an information bit stream which is sent to the encoder 114 for further processing before transmission. The encoder 114 may apply quadrature encoding to the information bits received from the output of the scrambler 112. The output streams of the encoder 114, which are sent to the codeword synthesizing system 115, may be complex-valued signal samples consisting of an in-phase component, I, and a quadrature component, Q.

The codeword synthesizing system 115 includes a base sequence generating subsystem (BSGS) 116, a modifier sequence generating subsystem (MSGS) 117 and a concatenating subsystem 118. The base sequence generating subsystem 116 is configured to create base sequences having a length less than a synthesized codeword associated with the transmitter. In addition, the modifier sequence generating subsystem 117 is configured to create a modifier sequence and the concatenating subsystem 118 is configured to produce the synthesized codeword by multiplying each of the base sequences by an element of the modifier sequence. In one embodiment, the base sequence generating subsystem 116 and the modifier sequence generating subsystem 117 may employ a memory device having a look-up table.

The codeword synthesizing system 115 creates a synthesized codeword that is multiplied with each data bit of the received output streams from the encoder 114. The synthesized codeword encodes each data bit from the received output streams from the encoder 114 resulting in a "spreading" of the data bit signal across a wider frequency bandwidth. The spread signal results in comparatively lower power spectral density, so that other communication systems are less likely to suffer interference from the transmitter 110. In addition, the resulting spread signal may be more difficult to detect and less susceptible to interference.

Unlike conventional spreader codes consisting of an entirely random code, the codeword synthesizing system 115 creates the synthesized codeword as concatenated repetitions of base sequences. Each of the base sequences are modified by a modifier sequence so that the synthesized codeword approximates a random sequence in terms of spectra and autocorrelation properties. The base sequences provide the opportunity to share intermediate results from a correlator on the receiving end instead of re-computing them. Typically, the length of the synthesized codeword is substantially equivalent to the product of a length of one base sequence and a length of a modifier sequence. In a preferred embodiment, the length of the base sequences may vary slightly. The codeword synthesizing system 115 will be discussed below in more detail with respect to FIGS. 2 and 3.

The RF front end 119 receives the spread signal from the codeword synthesizing system 115 for transmission. The RF front end 119 may contain a conventional quadrature modulator that multiplies the in-phase (I) and quadrature (Q) components received from the codeword synthesizing system 115 by a cosinusoidal carrier wave and a 90 degree phase-shifted sinusoidal carrier wave, respectively. The RF front end 119 may also include conventional filtering and amplification circuitry used to drive the antenna 125. The switch 120 connects the antenna 125 to either the transmitter 110 or the receiver 130 depending on if the spread spectrum communications transceiver 100 is transmitting or receiving information. When transmitting information, a transmitted spread signal is transmitted by the transmitter 110 via the switch 120 and the antenna 125 to another communications device.

When receiving information, the receiver 130 of the spread spectrum communications transceiver 100 receives a received spread signal from another communications device via the antenna 124 and the switch 120. Essentially, the process that took place in the transmitter 110 as described above is now reversed. The RF front end 131 may contain conventional amplification and filtering circuitry for conditioning the received spread signal and eliminating unwanted frequencies. The received spread signal may be mixed in a first mixer of the RF front end 131 with an in-phase signal produced by a local oscillator of the receiver 130 in order to recover the in-phase component of the received spread signal. The received spread signal may also be mixed in a second mixer of the RF front end 131 with a 90-degree phase shifted signal produced by the local oscillator in order to recover the quadrature component of the received spread signal. Typically, the outputs of the analog mixers in the RF front end 131 are digitized in A/D converters.

The outputs of the A/D converters are applied to the correlation system 132 which translates samples from the A/D converter into waveforms containing a large spike whenever a synthesized codeword associated with the receiver is detected. The correlation system 132 includes a partial correlating subsystem (PCS) 133, a memory subsystem (MS) 134 and a combining subsystem 135. The partial correlating subsystem 133 is configured to correlate base sequences of the synthesized codeword to a template and derive multiple partially correlated resultants. The memory subsystem 132 is configured to temporarily store the partially correlated resultants, and the combining subsystem 135 is configured to sum weighted values of the partially correlated resultants to provide a correlated value of the synthesized codeword. In one embodiment, the memory subsystem 134 may employ a random access memory. In addition, the correlation system 132 may be embodied in a field programmable gate array (FPGA). The correlation system 132 may also be embodied in an Application Specific Integrated Circuit (ASIC) or a hardwired device controlled by a sequence of operating instructions. The operation of the correlation system 132 will be discussed below in more detail with respect to FIGS. 4 and 5.

The spiked waveform outputs of the correlation system 132 are sent to the decoder 136. The decoder 136 may reverse the encoding process performed in the transmitter 110 by comparing the amplitudes and phases of the in-phase component and quadrature component of the spike waveforms to determine the synthesized codeword and a possible time-shift. The decoded bit stream from the decoder 136 is then descrambled by the descrambler 138, thereby producing the RECEIVED DATA OUT signal, which is analogous to the received spread signal. For more information regarding a spread spectrum transceivers, a transceiver similar to the one described above is disclosed in U.S. Pat. No. 5,128,960 to Van Driest, et al., entitled "Clock Recovery For A Wireless Local Area Network Station," and in U.S. Pat. No. 5,131,006 to Kamerman, et al., entitle "Carrier Detection For A Wireless Local Area Network," which are both incorporated herein by reference.

Figure 2:
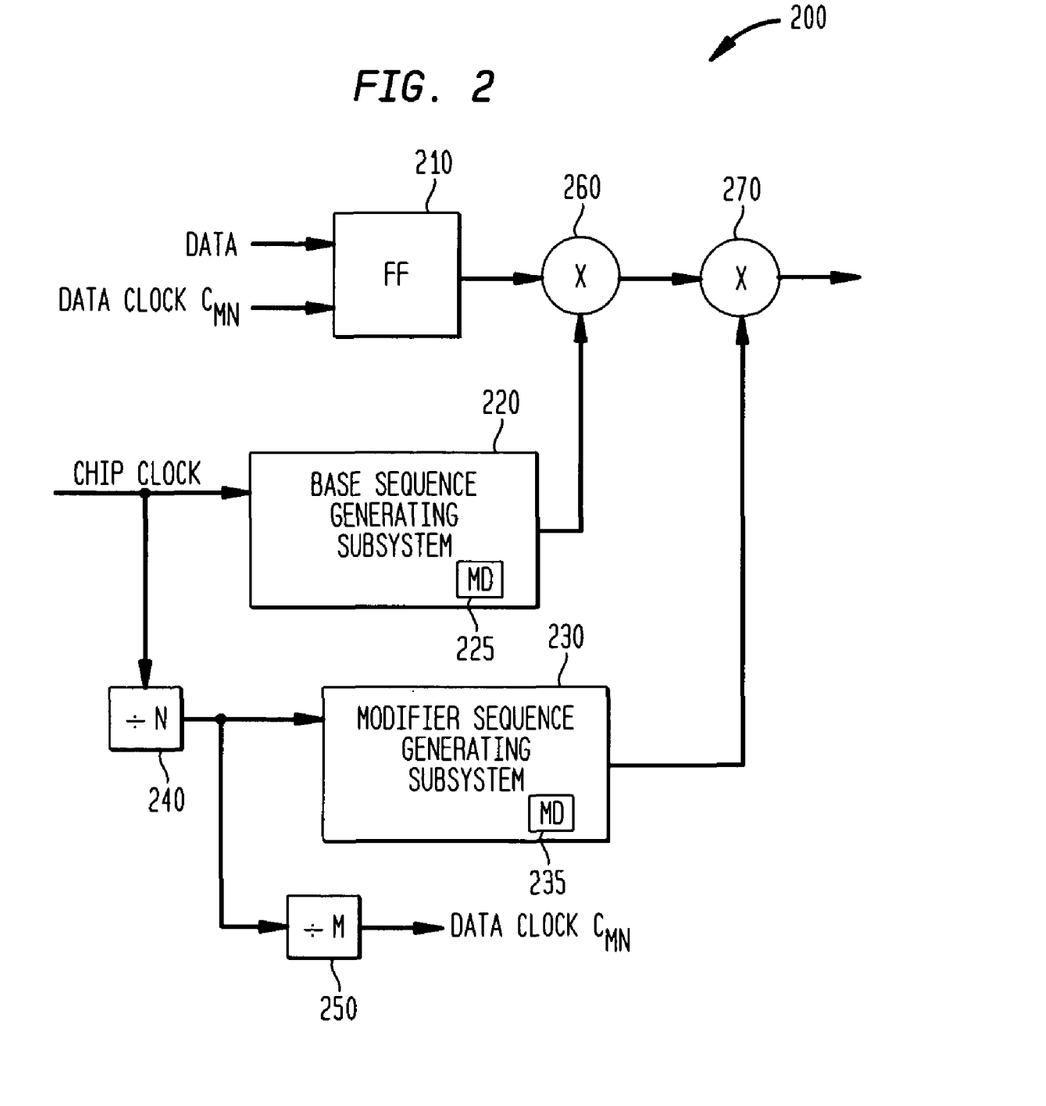
FIG. 2 illustrates a block diagram of an embodiment of a codeword synthesizing system constructed in accordance with the principles of the present invention.

Turning now to FIG. 2, illustrated is a block diagram of an embodiment of a codeword synthesizing system, generally designated 200, constructed in accordance with the principles of the present invention. The codeword synthesizing system 200 includes a flip flop (FF) 210, a base sequence generating subsystem 220, a modifier sequence generating subsystem 230, a first clock divider 240, a second clock divider 250, an EXCLUSIVE OR subsystem 260 and a concatenating subsystem 270.

The flip flop 210 is a conventional flip flop that receives digital data and is driven by a data clock. The data may be a serial stream of bits intended for wireless transmission. The data clock drives the flip flop 210 to output or "gate" a data bit from the data. The data clock is derived from a chip clock by dividing the chip clock by a first value N in the first clock divider 240 and then dividing the first clock divider 240 result by a second value M in the second clock divider 250. In the illustrated embodiment, the first value N represents a length of a base sequence and the second value M represents the number of repetitions of the base sequence concatenated to form a synthesized codeword. Each clock used with the codeword synthesizing system 200 may be a conventional clock typically employed within a spread spectrum communications transceiver.

The base sequence generating subsystem 220 repeatedly generates base sequences having a length less than a synthesized codeword at a chip rate based on the chip clock. In a preferred embodiment, the length of each base sequence may slightly vary. In some embodiments, the length of the synthesized code is substantially equivalent to a product of a base sequence length and a modifier sequence length.

The modifier sequence generating subsystem 230 generates the modifier sequence at a modified clock rate determined by the first clock divider 240. In a preferred embodiment, the modifier sequence is created to produce a randomization of the base sequences within the synthesized codeword. The modifier sequence and the base sequences may employ one of several codes including but not limited to pseudo random noise (PRN), Gold or Walsh codes. Each repetition of the base sequence that is generated by the base sequence generating subsystem 220 is accompanied by changing the output of the modifier sequence generating subsystem 230 to a next element in the modifier sequence. The base sequence generating subsystem 220 and the modifier sequence generating subsystem 230 may employ a look up table driven by a counter clocked at either the chip clock rate or the modified clock rate, respectively. Alternatively, the base sequence generating subsystem 220 and the modifier sequence generating subsystem 230 may employ an algorithmic structure to generate the base sequence and the modifier sequence. One skilled in the art will understand that the base sequence generating subsystem 220 and the modifier sequence generating subsystem 230 may employ various codes and various devices to generate the base sequences and the modifier sequence.

The EXCLUSIVE OR subsystem 260 and the concatenating subsystem 270 may be conventional logic devices that multiply two digital inputs resulting in an EXCLUSIVE OR'd output. The EXCLUSIVE OR subsystem 260 receives the base sequence from the base sequence generating subsystem 220 and multiplies each base sequence by a data bit from the flip flop 210. Depending on the data bit, the base sequence may be inverted or not. The output of the EXCLUSIVE OR subsystem 260 is received by the concatenating subsystem 270. The concatenating subsystem 270 multiplies each base sequence, which may be inverted depending on the current data bit from the flip flop 210, from the EXCLUSIVE OR subsystem 260 by a current element of the modifier sequence from the modifier sequence generating subsystem 230. The output of the concatenating subsystem 270 represents the data bit from the flip flop 210 as an encoded synthesized codeword having the second value M repetitions of the base sequences. Each base sequence may have an equivalent length of the first value N or the length of the base sequences may vary slightly. Each repetition of the base sequences may be inverted or not based on an entry in the modifier sequence which has a length of the second value M.

For example, the synthesized codeword may be 128 chips in length having a base sequence of sixteen (16) chips (N=16) and a modifier sequence of eight (8) chips (M=8). The base sequence generating subsystem 220 may repeatedly generate the sixteen (16) chip base sequences at the output chip rate from the first clock divider 240. Each sixteen (16) chip base sequence is multiplied by, or EXCLUSIVE-OR'd, with the current data bit from the flip flop 210 by the EXCLUSIVE OR subsystem 260. Each sixteen (16) chip base sequence and the current entry in the modifier sequence is then EXCLUSIVE-OR'd by the concatenating subsystem 270. Within one data clock cycle, the current data bit output of the flip flop 210 is ready to be wirelessly transmitted as the synthesized codeword of 128 chips consisting of a concatenation of eight (8) base sequences having a length of sixteen (16) chips which are inverted or not depending on the corresponding element of the eight (8) chip modifier sequence and the data bit.

Figure 3:
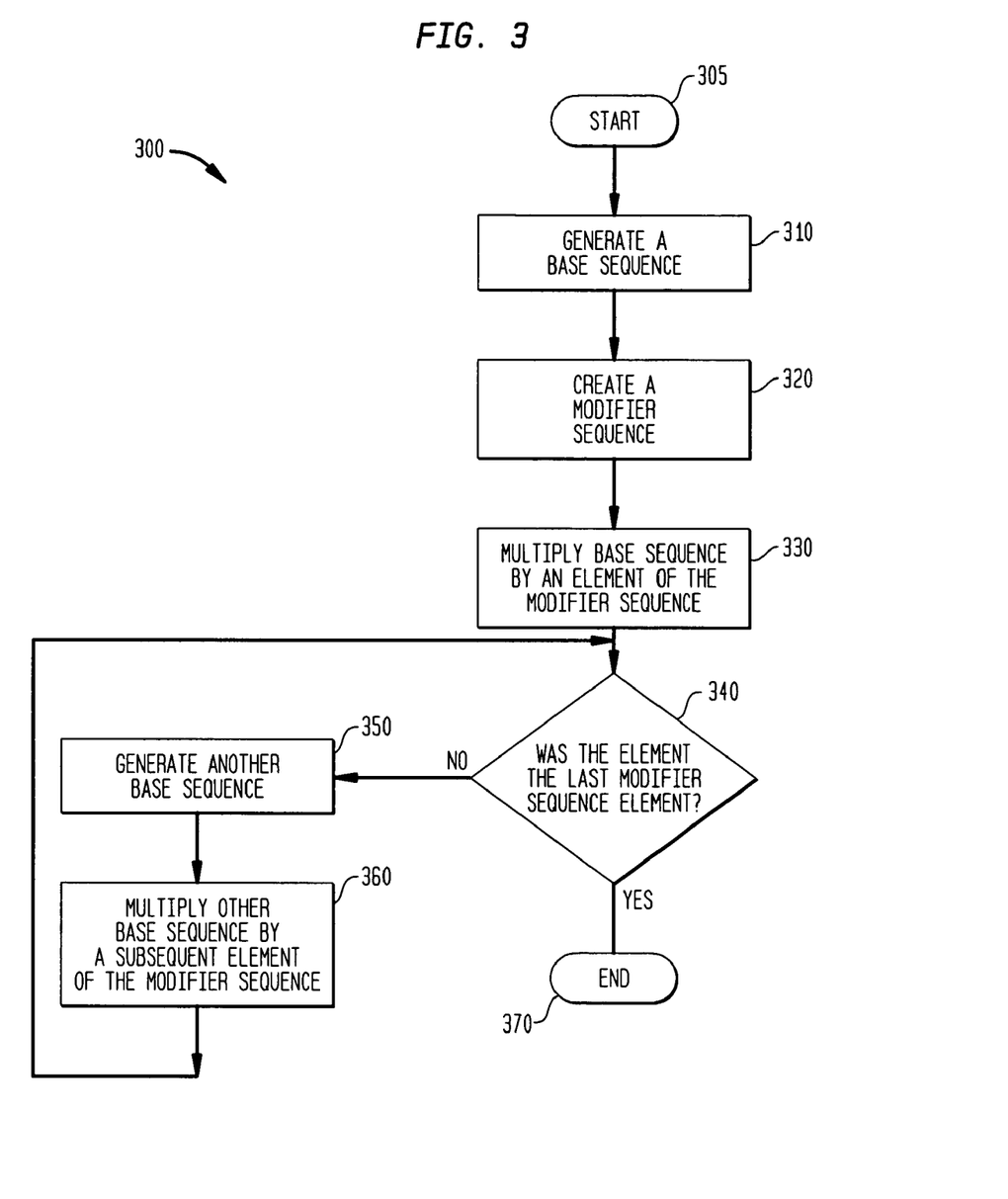
FIG. 3 illustrates a flow diagram of an embodiment of a method of synthesizing a codeword constructed in accordance with the principles of the present invention.

Turning now to FIG. 3, illustrated is a flow diagram of an embodiment of a method, generally designated 300, of synthesizing a codeword for use with a spread spectrum communications system, constructed in accordance with the principles of the present invention. The method 300 starts in a step 305 with an intent to synthesize a codeword.

After starting, a base sequence is generated in a step 310. The base sequence may be generated by a base sequence generating subsystem as discussed above with respect to FIGS. 1 and 2. The base sequence may be a variety of conventional codes including but not limited to PRN, Gold or Walsh codes. The base sequence may be generated by employing a memory device having a look-up table 225. In another embodiment, the base sequence may be generated by an embedded device having an algorithmic structure.

After generating a base sequence, a modifier sequence is created in a step 320. The modifier sequence may be created by a modifier sequence generating subsystem as discussed above with respect to FIGS. 1 and 2. In a preferred embodiment, the modifier sequence may be created to produce a randomization of base sequences within the synthesized codeword. Similar to the base sequence, the modifier sequence may also be created by employing a memory device having a look-up table 235 or an embedded device having an algorithmic structure. In addition, the modifier sequence may also be a variety of codes including PRN, Gold or Walsh codes.

Next, the base sequence is multiplied by an element of the modifier sequence. The base sequence may be multiplied or EXCLUSIVE OR'd with an element of the modifier sequence by a concatenating subsystem as discussed above with respect to FIGS. 1 and 2. In a preferred embodiment, a conventional EXCLUSIVE OR logical device may perform the multiplication of the base sequence and an element of the modifier sequence.

After multiplying the base sequence by an element of the modifier sequence, a determination is made if the element of the modifier was the last element of the modifier sequence in a decisional step 340. In a preferred embodiment, the modifier sequence is created to produce randomization of the base sequences within the synthesized codeword. Each element of the modifier sequence, therefore, multiplies a different base sequence. For example, the created modifier sequence may be +1, −1, +1, −1, +1, +1, −1, −1. The first element, of the modifier sequence +1, would be EXCLUSIVE OR'd with the first base sequence generated. The next base sequence would then be EXCLUSIVE OR'd with the second base sequence generated. Subsequent base sequences would then be multiplied by subsequent elements of the modifier sequence until each element of the modifier sequence has been used. If the multiplying element was the last element of the modifier sequence, then the method ends in a step 370.

Returning now to decisional step 340, if the multiplying element was not the last element of the modifier sequence, then the method generates another base sequence in a step 350. The other base sequence may be equivalent to the previous base sequence. In a preferred embodiment, the other base sequence may vary slightly in length compared to the previous base sequence. In addition, the other base sequence may also be generated by the base sequence generating subsystem used to generate the previous base sequence.

After generating another base sequence, the other base sequence is multiplied by a subsequent element of the modifier sequence. For example, as described above with respect to step 340, the second element of the modifier sequence may be −1, which would be EXCLUSIVE OR'd with the other base sequence. The method then returns to decisional step 340 for further processing until each element of the modifier sequence has been used as described above.

Figure 4:
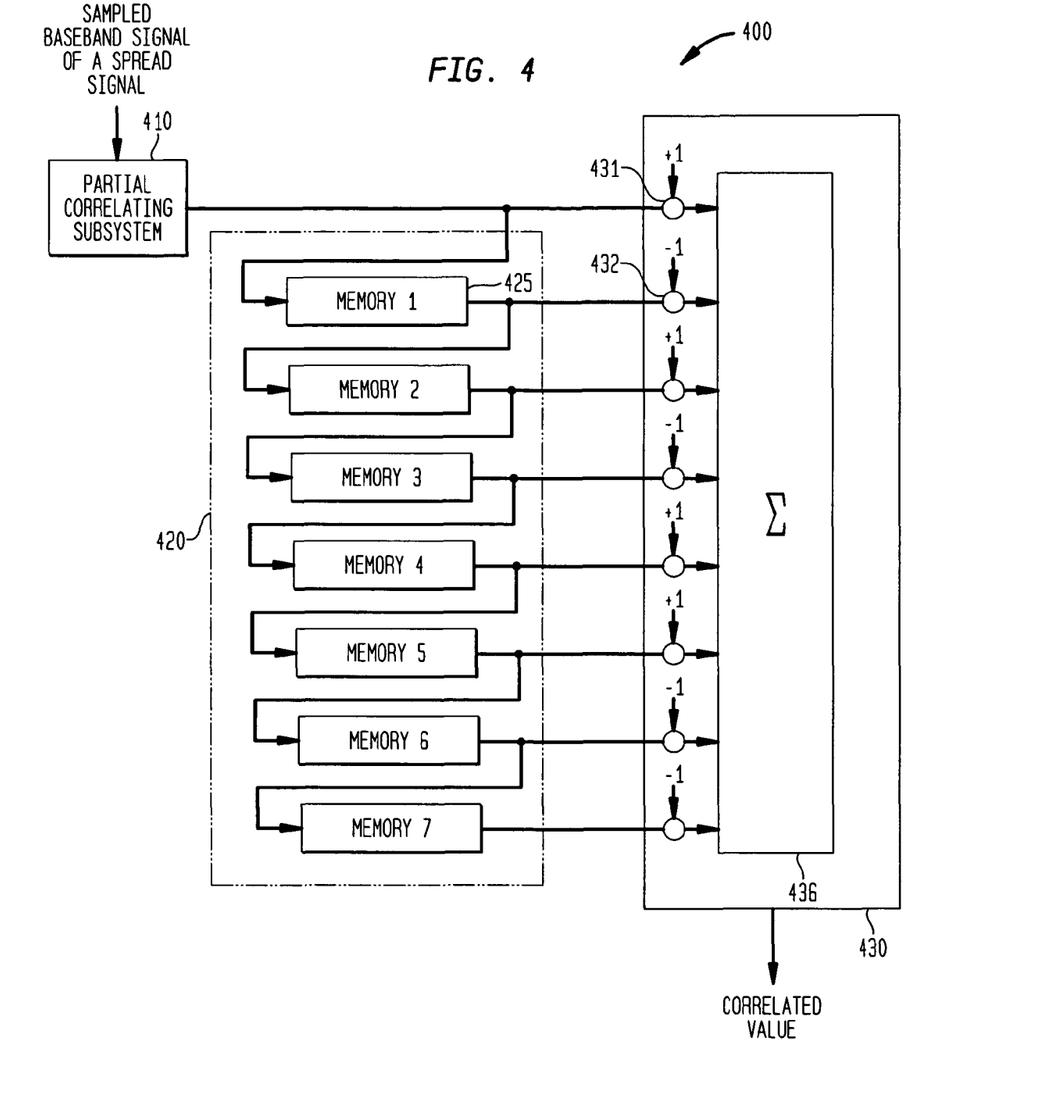
FIG. 4 illustrates a block diagram of an embodiment of a correlation system constructed in accordance with the principles of the present invention.

Turning now to FIG. 4, illustrated is a block diagram of an embodiment of a correlation system, generally designated 400, constructed in accordance with the principles of the present invention. The correlation system 400 includes a partial correlating subsystem 410, a memory subsystem 420 and a combining subsystem 430. The memory subsystem 420 includes a plurality of memory blocks with a first memory block designated 425. The combining subsystem 430 includes a plurality of weights with a first weight designated 431 and a second weight designated 432. In addition, the combining subsystem 430 includes a summer 436.

The correlation system 400 may be used with a spread spectrum communications system. For example, the correlation system 400 may be used in a communications system which employs Code Division Multiple Access (CDMA) system. In a preferred embodiment, the correlation system 400 is embodied within a FPGA.

The partial correlating subsystem 410 is configured to correlate base sequences of a synthesized codeword to a template and derive multiple partially correlated resultants. The partially correlated resultants are the output values of the partial correlating subsystem 410. The partially correlated resultants may be waveforms containing a large spike whenever a base sequence is detected by the partial correlating subsystem 410. In the illustrated embodiment, the partial correlating subsystem 410 is configured to correlate a sixteen (16) chip sequence of a synthesized codeword of 128 chips. Of course, one skilled in the art will understand that the partial correlating subsystem 410 may be configured to correlate base sequences of a variety of lengths in order to detect synthesized codewords having various lengths.

The partial correlating subsystem 410 may perform correlator function designed to detect codes by searching in time for a symbol codeword. The symbol codeword may be detected at call initiation and at each packet for packet oriented protocols. In spread spectrum communication systems, the symbol codeword is typically a pseudo-random number sequence which is unique to a designated correlator. Typically the correlator detects the symbol codeword by comparing a received spread signal to a template of the unique pseudo-random sequence. In the present embodiment, the symbol codeword is a synthesized codeword. Instead of detecting a pseudo-random number sequence, therefore, the partial correlating subsystem 410 detects base sequences of the synthesized codeword. Inasmuch as correlator may represent a significant cost to a receiver, a reduction in hardware cost may be realized since only base sequences of the synthesized codeword are correlated instead of the entire synthesized codeword.

The memory subsystem 420 is configured to temporarily store the partially correlated resultants from the partial correlating subsystem 410. The memory subsystem 420 may be a conventional shift register memory. In a preferred embodiment, the memory subsystem 420 may employ a conventional random access memory having a "Write" address pointer and a "Read" address pointer.

The combining subsystem 430 is configured to sum the weighted values of the partially correlated resultants to provide a correlated value of the synthesized codeword. The combining subsystem 430 includes the weights represented by the first weight 431 and the second weight 432, and the summer 436. The weights are an eight (8) chip code equivalent to a modifier sequence selected to randomize the effect of the base sequences over the synthesized codeword. The randomizing effect created by the modifier sequence optimally achieves a spectral spreading of the base sequences within the synthesized codeword. In the illustrated embodiment, the weights are +1, −1, +1, −1, +1, +1, −1, −1. Of course in other embodiments, different weights may be selected to achieve randomization of the base sequences. Regardless, the weights are equivalent to the modifier sequence to enable the detection of the synthesized codeword.

The summer 436 receives the weighted values of the partially correlated resultants from the partial correlating subsystem 410 and the plurality of memory blocks. The summer 436 may be a dedicated hardware device directed by a sequence of operating instructions. In a preferred embodiment, the summer 436 is embodied within an FPGA. The summer 436 sums each of the weighted values of the partially correlated resultants and produces a correlated value. When the correlation system 400 detects the synthesized codeword, the correlated value represents a signal processing gain similar to a signal processing gain realized by other correlators in a common spread spectrum communications receiver when a symbol codeword is detected.

For example, the partial correlating subsystem 410 may be employed within a CDMA receiver as discussed above with respect to FIG. 1 to detect a 128 chip synthesized codeword. The 128 chip synthesized codeword may be a concatenation of eight (8) sixteen (16) chip base sequences. The partial correlating subsystem 410 may receive a sampled baseband signal via a RF front end of a spread spectrum communications receiver. The partial correlating subsystem 410 may search for the sixteen (16) chip base sequence which has been replicated eight (8) times with varying weights to form the synthesized codeword. The partial correlating subsystem 410 may search the sampled baseband signal per each chip or every clock cycle by comparing the sixteen (16) current chips in the partial correlating subsystem 410 to the stored template of the base sequence. When the sixteen (16) current chips in the partial correlating subsystem 410 align with the stored template, the partial correlating subsystem 410 will output a value produced by a large dot product indicating a match and a detection of the sixteen (16) chip base sequence. The value of the partial correlating subsystem 410, the partially correlated resultant, is sent to the combining subsystem 430 and the first memory block 425.

In the combining subsystem 430, the weight of the first weight 431 is applied to the partially correlated resultant from the first sixteen (16) chips. After sixteen (16) more clock cycles, the stored value of the first memory block 425, which is the partially correlated resultant from the first sixteen (16) chips of the sampled baseband signal, is sent to the combining subsystem 430 and the weight of the second weight 432 is applied. After 32 clock cycles, therefore, the output of the partial correlating subsystem 410 and the first memory block 425 is sent to the combining subsystem 430 and the weights of the first weight 431 and the second weight 432 are applied, respectively. The summer 436 then sums the weighted values. At this point, the effect of a 32 chip correlator is realized while only employing a sixteen (16) chip correlator.

The partial correlating subsystem 410 may continue to process the sampled baseband signal one chip per each clock cycle. When 128 chips have clocked through the partial correlating subsystem 410, then the summer 436 sums the weighted values from the memory blocks and the partial correlating subsystem 410. If the partial correlating subsystem 410 has detected the sixteen (16) chip base sequence eight (8) times in succession, then the summer 436 will output a correlated value representing a signal processing gain and detection of the synthesized codeword. A 128 chip correlation, therefore, may be realized with a single sixteen (16) chip correlator (the partial correlating subsystem 410) and a memory (the memory subsystem 420) that is accessed twice each chip cycle to write an intermediate result and read a prior intermediate result.

One skilled in the art, of course, will understand that the length of the synthesized codeword and the partial correlating subsystem 410 may vary. For example, the synthesized codeword may be a length of 1024 chips and a concatenation of sixteen (16) equivalent base sequences of 64 chips in length with each base sequence weighted by an element of a modifier sequence (+1 or −1) to create the effect of randomization. In one embodiment, the partial correlating subsystem 410 may correlate base sequences having a length about an eighth (⅛) of the synthesized codeword. In other embodiments, the partial correlating subsystem 410 may correlate base sequences having a length about a fourth (¼) of the synthesized codeword. Of course, the partial correlating subsystem 410 may correlate base sequences of other lengths as well.

Figure 5:
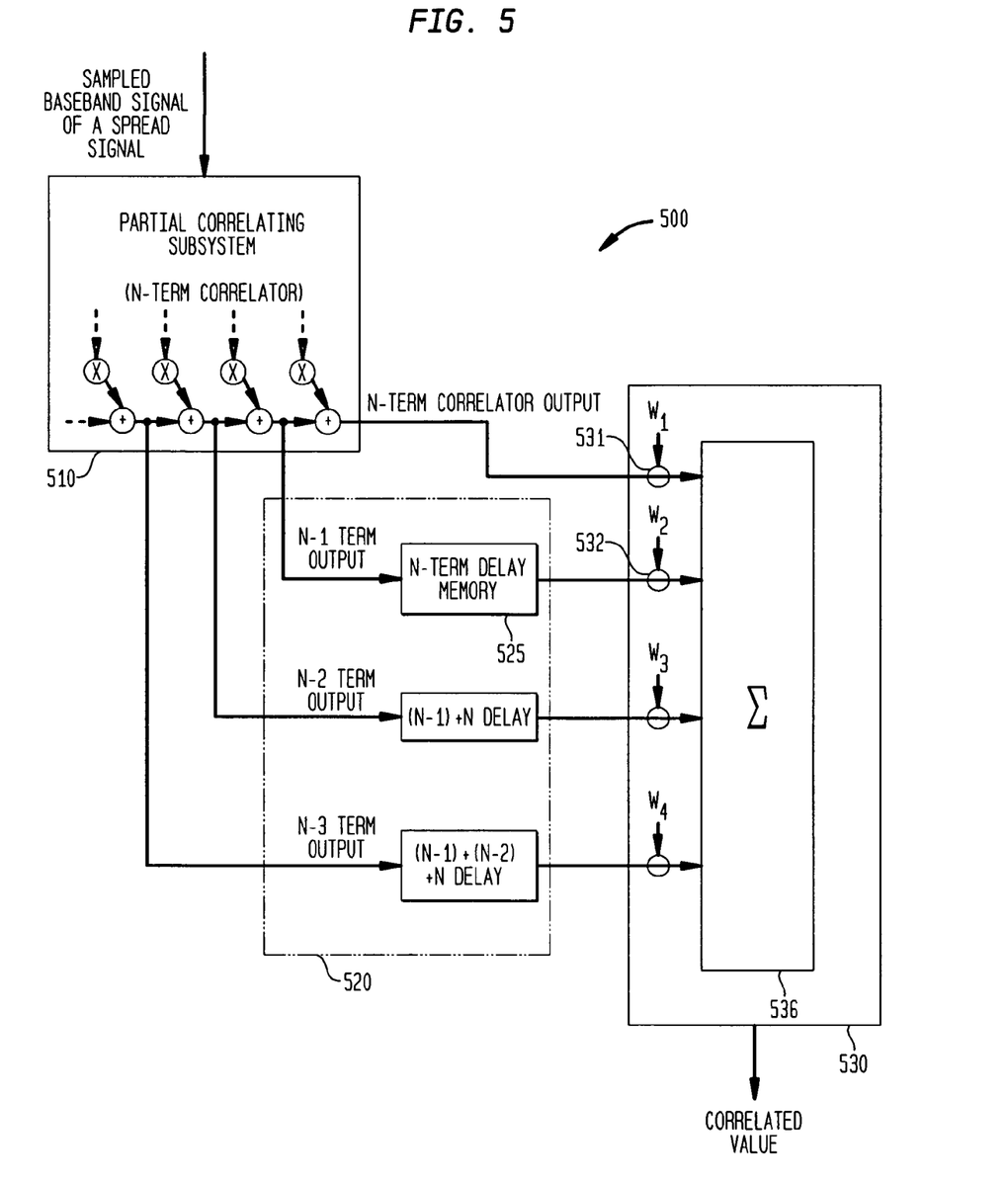
FIG. 5 illustrates a block diagram of yet another embodiment of a correlation system constructed in accordance with the principles of the present invention.

Turning now to FIG. 5, illustrated is a block diagram of yet another embodiment of a correlating system, generally designated 500, constructed in accordance with the principles of the present invention. The correlation system 500 includes a partial correlating subsystem 510, a memory subsystem 520 and a combining subsystem 530. The memory subsystem 520 includes a plurality of memory blocks with a first memory block designated 525. The combining subsystem 530 includes a plurality of weights with a first weight designated 531 and a second weight designated 532. In addition, the combining subsystem 530 includes a summer 536. The correlation system 500 operates analogously to the correlation system 400 discussed above with respect to FIG. 4 with the additional functionality as hereinafter described. In a preferred embodiment, the correlation system 500 may be embodied within an FPGA.

While the correlation system 400 discussed above with respect to FIG. 4 correlated equivalent base sequences of a synthesized codeword, the correlation system 500 described with respect to FIG. 5 correlates base sequences of a synthesized codeword having variable lengths for the reasons as set forth below. A shortcoming of a uniformly segmented synthesized codeword may occur when multiple base sequences of a received synthesized codeword and template are aligned creating significant spurious cross-correlations. The spurious cross-correlations may occur as a consequence of the fact that the base sequences differ only in sign. If each base sequence, however, is selected to be slightly different in length, spurious cross correlation peaks due to similarities in base sequences are not additive, i.e. do not occur at the same lag. The variable base sequence lengths produce the effect of distributing spurious cross correlations to reduce peak energy within limits which may be competitive with limits achieved by a truly random spreading sequence. The synthesized codeword, therefore, may be divided into a plurality of base sequences with slightly varied lengths. For example, considering again a 128 chip synthesized codeword, instead of each sequence having a length of sixteen (16) chips, some base sequences may have a length of fifteen (15) chips, seventeen (17) chips and fourteen (14) chips. The variable base sequence lengths, therefore, still allow a system (including hardware) savings but nevertheless also have the effect of distributing spurious cross correlations to reduce the peak energy of a received spread signal.

The partial correlating subsystem 510 is configured to correlate a value N length base sequences of a synthesized codeword by comparing the value N terms of a received baseband spread signal to a template. The output value of the partial correlating subsystem 510, the partially correlated resultant, is received by the combining subsystem 530 and weighted by the first weight 531. At the same clock cycle, a value N−1 Term partially correlated resultant of the partial correlating subsystem 510 is received by the first memory block 525 of the memory subsystem 520. The first memory block 525 stores the value N−1 Term partially correlated resultant as the value N-Term delay memory which is received by the combining subsystem 530 and weighted by the second weight 532. As illustrated, additional partially correlated resultants are stored in additional memory blocks of the memory subsystem 520. Once again using a 128 chip synthesized codeword as an example, the memory subsystem 520 may have seven (7) memory blocks or memory locations. After processing 128 chips, the combining subsystem 530 receives the partially correlated resultants from the memory blocks, applies the appropriate weights and the summer 536 sums the weighted values to produce a correlated value. As with the correlation system 400 discussed above with respect to FIG. 4, the correlated value of the correlation system 500 will represent a signal processing gain when the synthesized codeword is detected.

Figure 6:
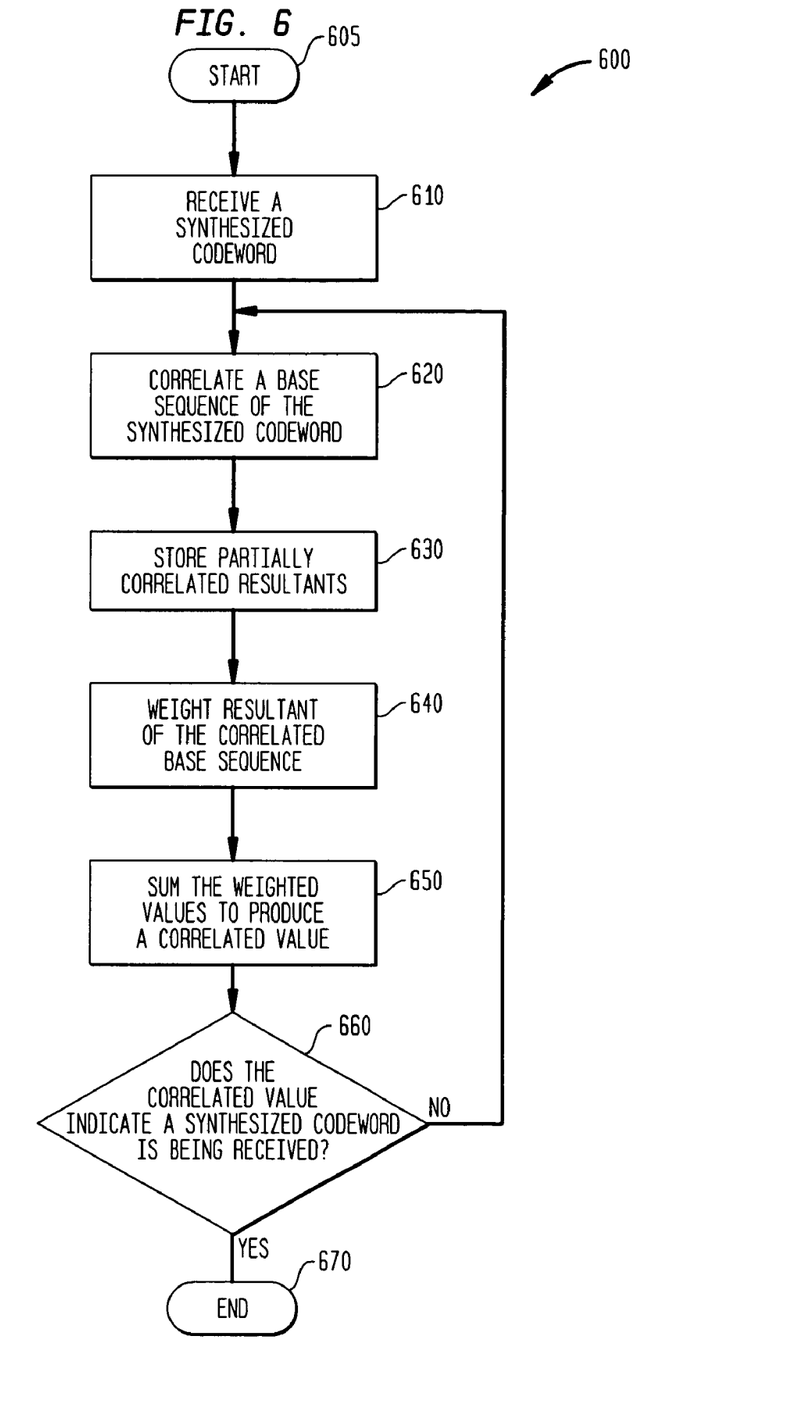
FIG. 6 illustrates a flow diagram of an embodiment of a method of correlating a synthesized codeword constructed in accordance with the principles of the present invention.

Turning now to FIG. 6, illustrated is a flow diagram of an embodiment of a method, generally designated 600, of correlating a synthesized codeword for use with a spread spectrum communications system, constructed in accordance with the principles of the present invention. The method 600 starts in a step 605 with an intent to correlate a synthesized codeword.

After starting, a synthesized codeword is received in a step 610. The synthesized codeword may be a sampled baseband signal from a spread signal received through an antenna of a spread spectrum communications system receiver. Typically, the synthesized codeword is employed as a symbol code. In a preferred embodiment, the spread signal may be a Code Division Multiple Access (CDMA) code.

After receiving the synthesized codeword, a base sequence of the synthesized codeword is correlated in a decisional step 620. The sequence may be correlated employing a partial correlating subsystem as described above with respect to FIGS. 4-5. Subsequent base sequences may be equal in length or may slightly vary in length. In one embodiment, the base sequences may have a length of about an eighth (⅛) or a fourth (¼) of the length of a synthesized codeword. One skilled in the art will understand that the length of the base sequences and the length of the synthesized codeword may vary. For example, the synthesized codeword may have a length of 128 chips or 1024 chips. The partial correlating subsystem may output a value, a partially correlated resultant, which may be used to indicate if the partial correlating subsystem detected a base sequence of the synthesized codeword.

After correlating a sequence of the synthesized codeword, the partially correlated resultant is stored in a step 630. The partially correlated resultant may be stored in a conventional shift register memory. In a preferred embodiment, the partially correlated resultant may be stored in a random access memory.

The stored partially correlated resultant is then weighted in a step 640. The weighted values may be elements of a modifier sequence consisting of a series of +1 and −1 such that each instance of the base sequence within the synthesized codeword may only differ by a sign.

After weighting the stored partially correlated resultant, the weighted value of the stored partially correlated resultant is summed in a step 650. The weighted value may be summed with the current partially correlated resultant from the partial correlating subsystem and previously stored partially correlated resultants to produce a correlated value. In a preferred embodiment, the summing may be performed by an FPGA.

After summing the weighted value, a determination is made if the correlated value indicates the synthesized codeword is being received in a decisional step 660. If the synthesized codeword is detected, the correlated value will represent a signal processing gain which may be a spike in a waveform. For example, the synthesized codeword may be a concatenation of eight (8) equivalent base sequences which are weighted by ±1 by the elements of a modifier sequence for randomization. After correlating the first sixteen (16) chips of the synthesized codeword, even if the base sequence is detected, the correlated value would not indicate a received signal since the entire synthesized codeword was not detected. In fact, the partially correlated resultant would have no other value to be summed with at this point. After processing 128 chips, however, the correlated value may represent a signal processing gain if the synthesized codeword is detected.

If it is determined that the synthesized codeword is being received, then the correlation ends in a step 670. Returning now to the decisional step 660, if the synthesized codeword is not detected, then the method 600 returns to the step 620 wherein the correlation of a synthesized codeword continues.

Although the present invention has been described in detail, those skilled in the art should understand that they can make various changes, substitutions and alterations herein without departing from the spirit and scope of the invention in its broadest form.

What is claimed is:

1. A codeword synthesizing system for use with a spread spectrum communications system, including:
   a base sequence generating subsystem configured to create, at a first clock rate, base sequences of a synthesized codeword having a length less than said synthesized codeword, said synthesized codeword employed to encode a data bit to be transmitted via said spread spectrum communications system;
   a modifier sequence generating subsystem configured to create, at a second clock rate, a modifier sequence having multiple elements;
   a concatenating subsystem configured to produce said synthesized codeword by multiplying repetitions of said base sequences by a different one of said multiple elements, wherein each of said repetitions is inverted or not inverted based on said different one of said multiple elements to produce randomization of said base sequences within said synthesized codeword.

2. The codeword synthesizing system as recited in claim 1 wherein a length of each of said base sequences varies.

3. The codeword synthesizing system as recited in claim 1 wherein said modifier sequence generating subsystem is configured to create said modifier sequence employing a code selected from the group consisting of:
   pseudo random noise (PRN),
   Gold codes, and
   Walsh codes.

4. The codeword synthesizing system as recited in claim 1 wherein said base sequence generating subsystem and said modifier sequence generating subsystem employ a memory device having a look-up table.

5. A method of synthesizing a codeword for use with a spread spectrum communications system, comprising:
   generating, at a first clock rate, base sequences of a synthesized codeword having a length less than a length of said synthesized codeword, said synthesized codeword employed to encode a data bit to be transmitted via said spread spectrum communications system;
   creating a modifier sequence having multiple elements at a second clock rate; and
   multiplying repetitions of said base sequences by a different one of said multiple elements to produce said synthesized codeword, wherein each of said repetitions is inverted or not inverted based on said different one of said multiple elements to produce randomization of said base sequences within said synthesized codeword.

6. The method as recited in claim 5 wherein a length of each of said base sequences varies.

7. The method as recited in claim 5 wherein said synthesized codeword has a length based on a product of a length of one of said base sequences and a length of said modifier sequence.

8. The method as recited in claim 5 wherein said generating and said creating employ a memory device having a look-up table.

9. A correlation system for use with a spread spectrum communications system, comprising:
   a partial correlating subsystem configured to correlate base sequences of a synthesized codeword to a template and derive multiple partially correlated resultants, wherein said synthesized codeword includes repetitions of said base sequences that are inverted or not inverted to produce randomization of said base sequences within said synthesized codeword, said synthesized codeword employed to encode a data bit to be transmitted via said spread spectrum communications system;
   a memory subsystem configured to temporarily store said partially correlated resultants; and
   a combining subsystem configured to sum weighted values of said partially correlated resultants to provide a correlated value of said synthesized codeword.

10. The correlation system as recited in claim 9 wherein said partial correlating subsystem is configured to correlate base sequences having a variable length.

11. The correlation system as recited in claim 9 wherein said partial correlating subsystem is configured to correlate base sequences having a length selected from the group consisting of:
    about an eighth (1/8) of said synthesized codeword, and
    about a fourth (1/4) of said synthesized codeword.

12. The correlation system as recited in claim 9 wherein said memory subsystem employs random access memory.

13. The correlation system as recited in claim 9 wherein said correlation system is embodied within an field programmable gate array (FPGA).

14. A method of correlating a synthesized codeword for use with a spread spectrum communications system, comprising:
    correlating base sequences of said synthesized codeword to a template and deriving multiple partially correlated resultants, wherein said synthesized codeword includes repetitions of said base sequences that are inverted or not inverted to produce randomization of said base sequences within said synthesized codeword, said synthesized codeword employed to encode a data bit to be transmitted via said spread spectrum communications system;
    storing temporarily said multiple partially correlated resultants;
    summing weighted values of said multiple partially correlated resultants to provide a correlated value of said synthesized codeword.

15. The method as recited in claim 14 wherein said base sequences have a variable length.

16. The method as recited in claim 14 wherein said base sequences have a length selected from the group consisting of:
    about an eighth (1/8) of said synthesized codeword, and
    about a fourth (1/4) of said synthesized codeword.

17. The method as recited in claim 14 wherein said storing employs a random access memory.

18. The method as recited in claim 14 wherein said method is embodied within a field programmable gate array (FPGA).

19. A spread spectrum communications system transceiver, comprising:
    an antenna;
    a transmitter, including:
      a codeword synthesizing system, including:
        a base sequence generating subsystem configured to create, at a first clock rate, base sequences of a synthesized codeword associated with said transmitter having a length less than said synthesized codeword, said synthesized codeword employed to encode a data bit,
        a modifier sequence generating subsystem configured to create, at a second clock rate, a modifier sequence having multiple elements, and
        a concatenating subsystem configured to produce said synthesized codeword associated with said transmitter by multiplying repetitions of said created base sequences by a different one of said multiple elements, wherein each of said repetitions is inverted or not inverted based on said different one of said multiple elements to produce randomization of said created base sequences within said synthesized codeword associated with said transmitter; and a receiver, including:
  a correlation system, including:
    a partial correlating subsystem configured to correlate received base sequences of a received synthesized codeword to a template and derive multiple partially correlated resultants, wherein said received synthesized codeword includes repetitions of said received base sequences that are inverted or not inverted to produce randomization of said received base sequences within said received synthesized codeword,
    a memory subsystem configured to temporarily store said partially correlated resultants, and
    a combining subsystem configured to sum weighted values of said partially correlated resultants to provide a correlated value of said received synthesized codeword.

20. The spread spectrum communications system transceiver as recited in claim 19 wherein said created base sequences or said received base sequences have a variable length.

21. The spread spectrum communications system transceiver as recited in claim 19 wherein said memory subsystem employs random access memory.

22. The spread spectrum communications system transceiver as recited in claim 19 wherein said correlation system is embodied in a field programmable gate array.

23. The spread spectrum communications system transceiver as recited in claim 19 wherein said base sequence generating subsystem and said modifier sequence generating subsystem employ a memory device having a look-up table.

24. The codeword synthesizing system as recited in claim 1 wherein said first clock rate is a chip clock rate and said second clock rate is said chip clock rate divided by a value representing said length.

25. The codeword synthesizing system as recited in claim 1 wherein said each of said repetitions of said base sequences generated by said generating subsystem is accompanied by changing an output of said modifier sequence generating subsystem to a next element in said modifier sequence.

* * * * *